(12) United States Patent
Sandberg et al.

(10) Patent No.: US 6,406,815 B1
(45) Date of Patent: Jun. 18, 2002

(54) COMPACT LITHIUM ION BATTERY AND METHOD OF MANUFACTURING

(75) Inventors: Murray G. Sandberg, Henderson, NV (US); Morgan Rey Benson, Indianapolis, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/502,706

(22) Filed: Feb. 11, 2000

(51) Int. Cl.[7] .............................. H01M 4/58; H01M 2/00
(52) U.S. Cl. .................. 429/231.95; 429/163; 429/162; 429/152; 429/124; 429/127
(58) Field of Search ........................... 429/231.95, 162, 429/163, 124, 127, 152; 29/623.1

(56) References Cited

U.S. PATENT DOCUMENTS

| | | | | |
|---|---|---|---|---|
| 4,579,792 A | * | 4/1986 | Bruder | 429/162 |
| 5,518,836 A | * | 5/1996 | McCullough | 429/94 |
| 5,567,544 A | * | 10/1996 | Lyman | 429/152 |
| 5,773,959 A | | 6/1998 | Merritt et al. | |
| 5,849,434 A | | 12/1998 | Miura et al. | |
| 5,853,914 A | | 12/1998 | Kawakami | |
| 5,874,185 A | | 2/1999 | Wang et al. | |
| 5,900,183 A | | 5/1999 | Kronfli et al. | |
| 5,952,126 A | | 9/1999 | Lee et al. | |
| 5,961,672 A | | 10/1999 | Skotheim et al. | |

OTHER PUBLICATIONS

Linden, David, ed. *Handbook of Batteries*, Second Edition, Chapters 36 and 39. U.S.: McGraw–Hill, Inc., 1995.

* cited by examiner

*Primary Examiner*—Gabrielle Brouillette
*Assistant Examiner*—Angela J. Martin
(74) *Attorney, Agent, or Firm*—Margaret A. Dobrowitsky

(57) ABSTRACT

Described is a lithium ion battery 10 comprising:

A housing having a front side 13 and a backside 15 and an anode cell terminal 60 and a cathode cell 44 terminal separated therefrom;

Positioned within the housing a plurality of bipolar lithium ion cells 40 having an lithium ion permeable plastic separator 32 there between; the cell electrodes being comprised of a thin film plastic substrate 34 and being electrically connected appropriately to the anode and the cathode cell terminals;

wherein the cells are longitudinally placed in the housing parallel to the sides of the housing; and wherein the housing is enclosed by the cathode cell terminal at one end and the anode cell terminal at the opposite end of the cell sleeve; and the enclosed housing is capable of receiving an electrolyte placed between the cells and the electrolyte is capable of carrying ions between the anode and the cathode. Also described is a method of manufacturing the lithium ion batteries.

3 Claims, 3 Drawing Sheets

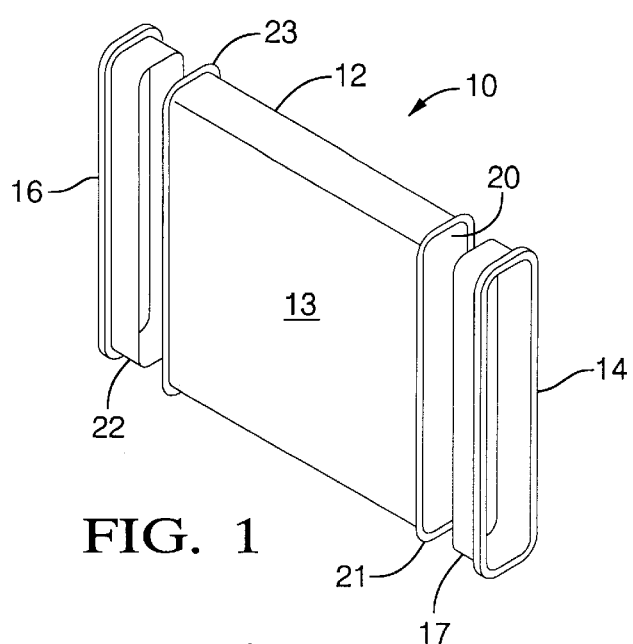
FIG. 1
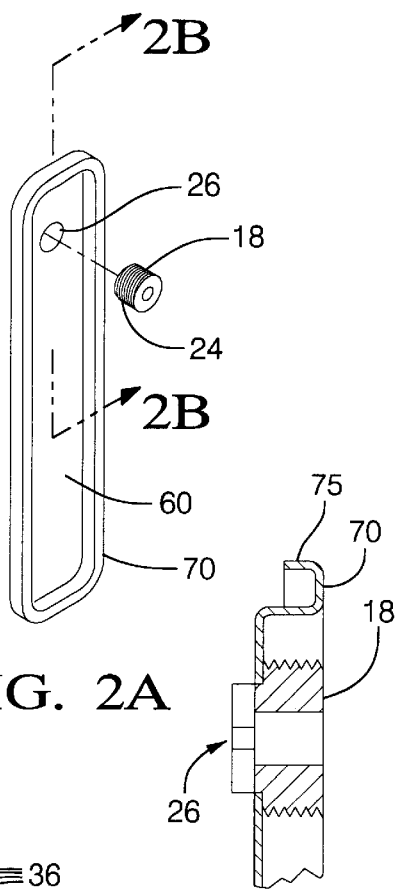
FIG. 2A
FIG. 2B
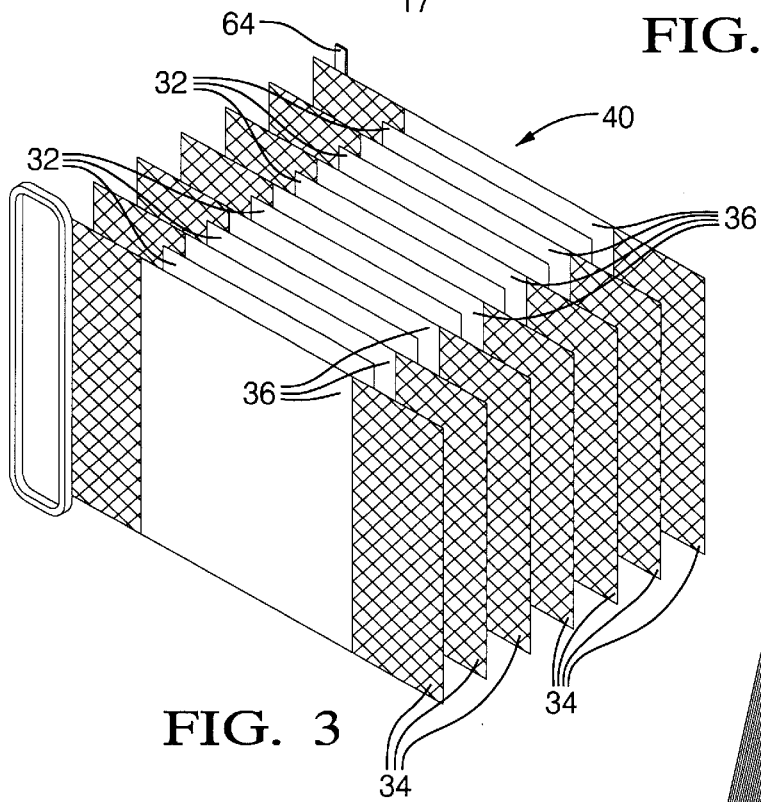
FIG. 3
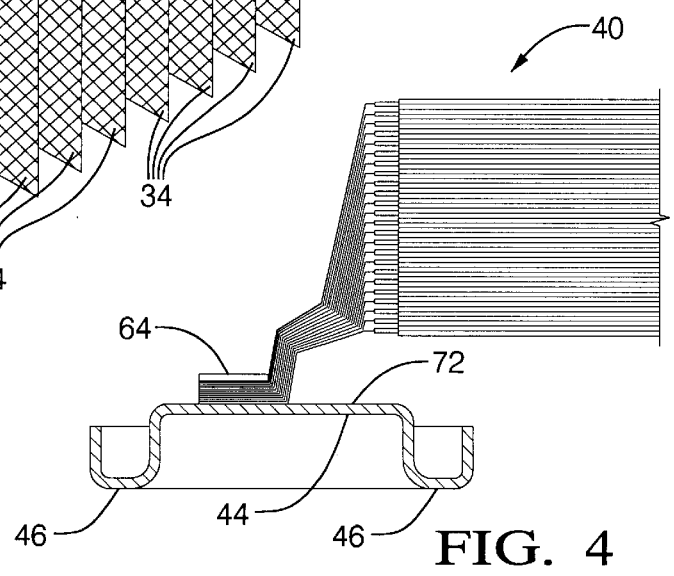
FIG. 4

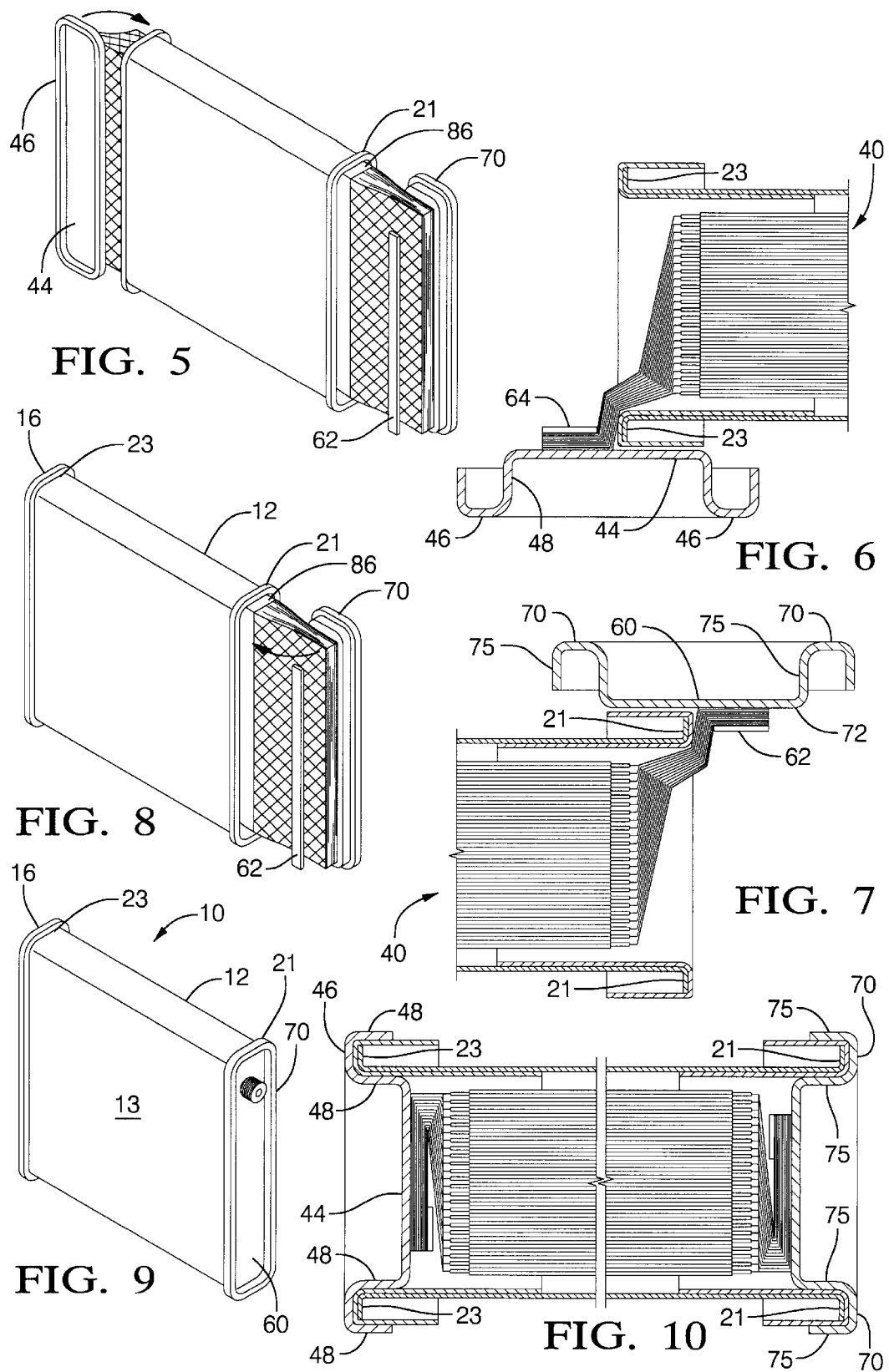

COMPACT LITHIUM ION BATTERY AND METHOD OF MANUFACTURING

FIELD OF THE INVENTION

The present application pertains to rechargeable lithium ion batteries, and in particular, to a compact lithium ion battery module utilizing bipolar electrodes.

BACKGROUND OF THE INVENTION

Lithium batteries are seen by many to be an attractive energy storage device. Lithium ion batteries have been targeted for various applications such as portable electronics, cellular phones, power tools, electric vehicles, and load-leveling/peak-shaving. The batteries are currently replacing many other traditional power sources such as lead acid batteries, nickel cadmium batteries, and nickel metal hydride batteries. Lithium ion batteries have been known to be out for many years (see the *Handbook of Batteries*, David Linden, editor, second edition by McGraw-Hill, copyright 1995, in particular, chapters 36 and 39). Various aspects of lithium batteries have been described in a variety of U.S. Patents, such as U.S. Pat. No. 5,961,672 pertaining to a stabilized anode for lithium polymer batteries. U.S. Pat. No. 5,952,126 pertains to polymer solid electrolyte and lithium secondary cells. U.S. Pat. No. 5,900,183 pertains to polymer electrolytes as well as does U.S. Pat. No. 5,874,185. U.S. Pat. No. 5,849,434 describes non-aqueous electrolyte lithium secondary batteries. Other variations on lithium batteries are described in U.S. Pat. Nos. 5,853,914 and 5,773,959.

Appropriately packaging lithium ion batteries is particularly difficult in the automotive environment due to the need for corrosion resistance, crush and crash worthiness, and vibration resistance. The problems of such batteries can be characterized as a need for better seal robustness, namely overcome leak potential from internal pressure; better packaging robustness, namely better crush/crash worthiness; better thermal exchange properties, namely ability to dissipate heat and receive cooling more effectively; ease of processing and transitioning into mass production, that is, processes that lend themselves to automation.

It is an object of the present invention to provide a lithium ion battery wherein bipolar electrodes are utilized with a lithium ion permeable polymer membrane or separator there between, and the cell electrodes being electrically connected appropriately to the anode and cathode terminals which are at opposite ends of the housing for the battery.

SUMMARY OF THE INVENTION

Described is a lithium ion battery 10 comprising:

A housing 12 having a front side 13 and a backside 15 and an anode terminal 60 and a cathode terminal 44 separated therefrom;

positioned within the housing a plurality of bipolar lithium ion cells 40 having a polymer separator 32 there between, optionally a lithium ion permeable membrane; the cell electrodes being comprised of a thin film plastic substrate 34 and being electrically connected appropriately to the anode and the cathode terminals, respectively;

wherein the cells are longitudinally placed in the housing parallel to the sides of the housing; and wherein the housing is enclosed by the cathode terminal at one end and the anode terminal at the opposite end of the housing; and the enclosed housing is capable of receiving an electrolyte placed between the cells and the electrolyte is capable of carrying ions between the anode and the cathode.

BRIEF DESCRIPTION OF THE DRAWINGS

FIG. 1 is an exploded view of the compact lithium battery which is comprised of a cell sleeve and plastic end sleeves of the present invention.

FIG. 2A is a side view of FIG. 9.

FIG. 2B is a side sectional view of FIG. 2A.

FIG. 3 is an exploded view of the bipolar electrodes with a non-permeable or permeable separator there between as utilized in the present invention.

FIG. 4 depicts the bipolar stack of electrodes attached to the cathode cell terminal with the cathode grid ultrasonically welded thereto.

FIG. 5 is a perspective view of the lithium ion battery of the present invention with the battery stack welded on the cathode end and inserted into the cell sleeve.

FIG. 6 is a top sectional view of FIG. 5.

FIG. 7 depicts the first step in attaching the anode cell terminal to the anode grid of the bipolar electrodes and is a top sectional view of FIG. 5, anode side.

FIG. 8 shows the anode terminal secured to the anode grid of the bipolar electrode stack.

FIG. 9 depicts the lithium ion battery of the present invention in its final form, prior to crimping and securing the battery housing comprised of a cell sleeve within the end terminals.

FIG. 10 is a top sectional view of the battery of FIG. 9.

DESCRIPTION OF PREFERRED EMBODIMENTS

Figure 11:
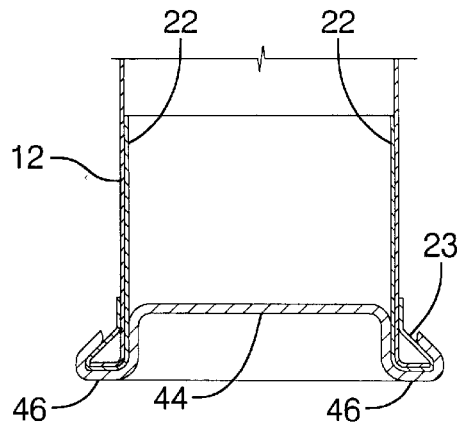
FIG. 11 depicts the top partial sectional view of the cell housing showing the first step of the crimping of the end terminals to the housing.
Figure 12:
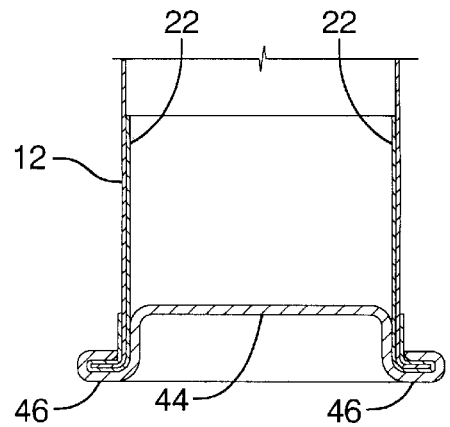
FIG. 12 is the second step in the crimping of the battery cell terminals to the housing.
Figure 13:
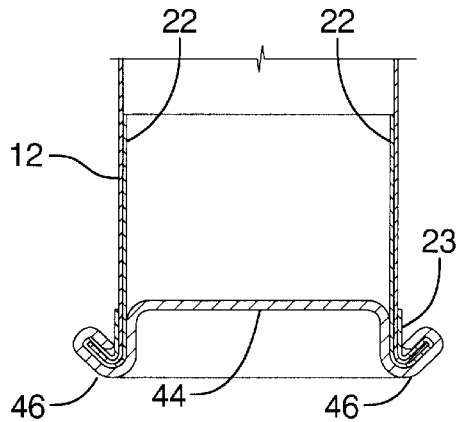
FIG. 13 is the third step in the crimping of the battery cell terminals to the housing.
Figure 14:
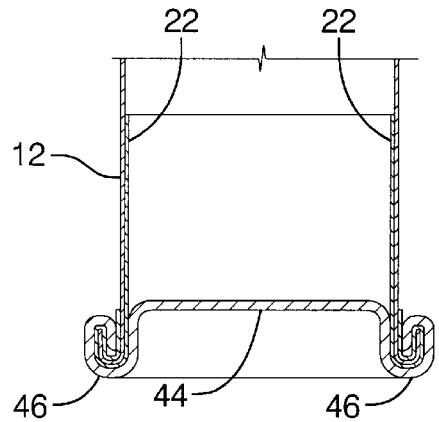
FIG. 14 is the final step in the crimping process of securing the battery cell terminals to the housing.

The present invention pertains to lithium ion batteries that are prepared into compact, bipolar cell arrangements. While bipolar cells are demonstrated in the present invention, monopolar cells may likewise be utilized. A wide variety of rechargeable lithium batteries may be utilized, such as those disclosed in Chapter 36 in the *Handbook of Batteries*, supra, U.S. Pat. Nos. 5,460,904 and 5,456,000.

Turning now to the drawings, FIG. 1 depicts the lithium ion battery 10 with its component parts, namely, the housing or cell sleeve 12 which has end protective plastic sleeves 14 and 16 with extensions 17 for the anode side and 22 for the cathode side which fit within the cell sleeve interior 20 to secure and isolate the bipolar cells therein. The cell sleeve 12 has an end 21 near the anode terminal 60 and an end 23 near cathode terminal 44. The use of the terminology "sleeve" is appropriate for the housing. It connotes a rectangular open structure in which the battery stack is placed.

A one-way valve housing 18 is pressed and soldered into the anode cell terminal 60 and has an extended portion 24 which fits within the interior 20 of the cell sleeve. The valve housing 18 has a valve that fits in the interior of the cell, which permits a gas to be released therefrom. In addition, during the manufacturing and assembling of the cell, electrolyte may be passed through the port 26 of the anode terminal 60.

The electrode stack 40 is comprised of bipolar electrodes 36 with lithium ion permeable polymer membrane 32 between the different cells. Optionally the membrane 32 is not lithium permeable. While a wide variety of materials can be utilized for the bipolar cells and the polymer membrane, one type of cathode could be a lithium metal oxide such as lithium manganese oxide or lithium cobalt oxide. The anode may be a carbon plastic film with a copper current collector. The bipolar electrodes utilize a stable substrate 34 on which is deposited a lithium ion material 36. The substrate for the lithium cathode can be a material that is stable in the environment of lithium ion cells having a thickness of less than 100 mils. A wide variety of thin film plastic substrates may be utilized, such as polyvinylidene difluoride (PVDF). The polymer membrane or separators 32 likewise can be a wide variety of thin film plastic materials having a thickness of less than 100 mils. One material is Mylar (trademark of DuPont for a polyester film).

As shown in FIG. 3, the bipolar stack of electrodes 40 is attached to the cathode cell terminal 44 which has a lip thereto 46. The cathode cell terminal has an extension 48 which surrounds the cell sleeve 23 (see FIG. 10). The cathodes are secured to one another ultrasonically and also to the cathode terminal 44 by means of the extended grid 64.

FIGS. 4, 5 and 6 depict the ultrasonic weld attaching the extension 64 to the interior portion 72 of the cathode 44. Commercially available ultrasonic welding equipment may be utilized such as Condor ST301 (trademark of Stapla Corp.)

The anode terminal 60 has an anode grid strip 62 mechanically securing each of the anode grids together. They are ultrasonically welded together by the commercially available equipment. See FIGS. 5 and 7.

FIG. 7 depicts the anodes ultrasonically welded to the extension 62. The lip of the cell sleeve 21 is shown as captured within the interior 72 of the anode. The anode 60 has a lip portion 70 with extension portions 75 which snugly cover cell sleeve 21 (see FIGS. 7 and 10).

After the cathodes of the bipolar electrode stack 40 are ultrasonically welded to the cathode terminal 44, the cell sleeve 12 may be slid over the stack. Then the cathode cell terminal 44 may be pivoted as shown in FIG. 5 onto the end 23 of the cell sleeve. The anodes of the bipolar stack, as shown in FIGS. 5 and 7, may be then ultrasonically welded to the anode cell terminal 60. The anode cell terminal 60 has a lip portion 70 as best shown in FIGS. 5 and 7. The anode cell terminal 60 may then be pivoted onto the end of the cell sleeve 21 as shown in FIG. 8. The lithium ion battery takes on the appearance of a cell can as shown in FIG. 10. It is then ready for crimping to secure the bipolar stack within the sleeve as shown in FIGS. 9 and 10. The cell terminals are crimped about the cell sleeve in four stages as shown schematically in FIGS. 11, 12, 13, and 14. Only the cathode end is depicted in FIGS. 11–14. Clearly the same is applicable on the anode side as well. The plastic sleeve 16 is depicted in FIGS. 11–14, and its extension 22 fits snugly within the cell sleeve 12. As can be seen in FIGS. 11–14, the sleeve extension 22 electrically insulates the cathode 44 from the cell housing 12.

Figure 15:
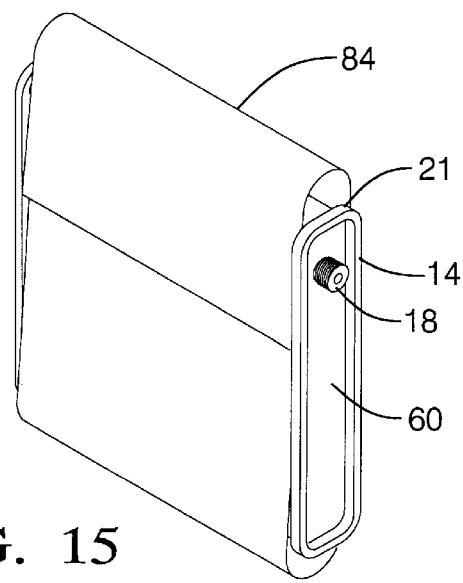
FIG. 15 is a finished lithium ion battery being covered with a protective wrap.
Figure 16:
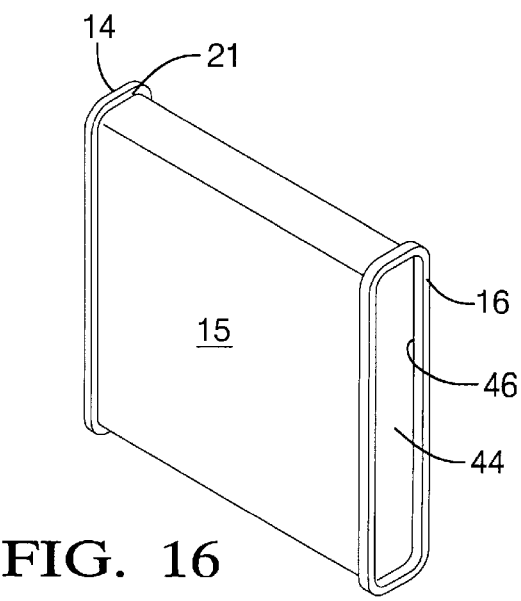
FIG. 16 is the backside view of FIG. 15.

To further insulate the battery components, the lithium ion battery may be wrapped with a cell wrap 84 which is a plastic material as polyethylene or polypropylene as shown in FIGS. 15 and 16. A seal 86 is present on the sleeve to electrolytically insulate the sleeve from the battery stack 40. The extensions 22 for the cathode plastic insert and 17 for the anode plastic insert fit within the interior 20 of the sleeve 12. The extensions are generally made of a stable plastic material, namely one that is stable within the environment of the lithium ion batteries. It is comprised of a material that is resistant to electrolyte such as a polypropylene and the like.

The cathode materials are comprised of the same polymer as the electrodes. They may or may not comprise stabilizing materials such as silica or plasticizer. The plasticizer, during the manufacturing process, will be dissipated and is generally not present in the final product.

The present invention provided for ganging the electrode grids which are present in the flat stack and ultrasonically welding the grid stack to the inside of each appropriate stack end, namely the cell terminal. Thereafter, the crimping may permit sealing the sleeve shut.

Further, a plastic sleeve is contained in each crimp and acts as a seal and electrical insulator between the sleeve parts and between the grid and sleeve parts.

The valve housing serves multiple purposes. The housing initially provides a port for activation by filling electrolyte therein. Then it provides for the containment of the valve and permits release of gas.

The large metallic surfaces 12 act as a good thermal insulator, that is metallic surfaces of the housing.

By virtue of the crimping process, a good seal is obtained because malleable plastic components create a robust package, that is a package that is crush/crash worthy.

By virtue of the ultrasonic welding of the electrodes to the respective anode terminal and cathode terminal, there is good current distribution across the active materials and out to the cell terminals.

It is to be appreciated that the number of electrodes in the battery stack can vary. One configuration has about 45 bicells containing 9 anodes and 45 cathodes having a capacity of 30–40 amp hours at about 4 volts.

It is understood that the following claims are intended to cover all of the generic and specific features of the invention herein described. And all statements of the scope of the invention which as a matter of language might be said to fall there between.

While the forms of the invention herein disclosed constitute presently preferred embodiments, many others are possible. It is not intended herein to mention all of the possible equivalent forms or ramifications of the invention; it is understood that the terms used herein are merely descriptive rather than limiting and that various changes may be made without departing from the spirit or scope of the invention.

What is claimed is:

1. A lithium ion battery comprising:
   a housing having a front side and a backside and an anode terminal and a cathode terminal separated therefrom;
   positioned within the housing a plurality of bipolar lithium ion cells having a polymer separator therebetween; the cell electrodes being comprised of a thin film plastic substrate and being electrically connected to the anode and the cathode cell terminals;
   wherein the cells are longitudinally placed in the housing parallel to the sides of the housing;

wherein the housing is enclosed by the cathode cell terminal at one end and the anode cell terminal at the opposite end of the housing; and wherein the one of the terminals has a port for insertion of electrolyte into the battery after assembly of the cells within the housing;

the enclosed housing optionally containing an electrolyte placed between the cells, wherein the electrolyte carries ions between the anode and the cathode.

2. A lithium ion battery comprising:

a housing having a front side and a backside and an anode terminal and a cathode terminal separated therefrom;

positioned within the housing a plurality of bipolar lithium ion cells having a polymer separator therebetween; the cell electrodes being comprised of a thin film plastic substrate and being electrically connected appropriately to the anode and the cathode cell terminals;

wherein the cells are longitudinally placed in the housing parallel to the sides of the housing;

wherein the housing is enclosed by the cathode cell terminal at one end and the anode cell terminal at the opposite end of the housing;

wherein one of the terminals has a vent for gas release therefrom;

the enclosed housing optionally containing an electrolyte placed between the cells and the electrolyte carries ions between the anode and the cathode.

3. A lithium ion battery comprising:

a housing having a front side and a backside and an anode terminal and a cathode terminal separated therefrom;

positioned within the housing a plurality of bipolar lithium ion cells having a polymer separator therebetween; the cell electrodes being comprised of a thin film plastic substrate and being electrically connected appropriately to the anode and the cathode cell terminals;

wherein the cells are longitudinally placed in the housing parallel to the sides of the housing;

wherein the housing is enclosed by the cathode cell terminal at one end and the anode cell terminal at the opposite end of the housing;

wherein the cells are retained within a cell sleeve surrounding the longitudinal length of the cells within the housing;

wherein the cell sleeve extends beyond the length of the cells and which extensions are retained in a plurality of metallic clips, one of which is the anode and another is the cathode;

the enclosed housing optionally containing an electrolyte placed between the cells and the electrolyte carries ions between the anode and the cathode.

* * * * *